US011935407B1

(12) United States Patent
Wang et al.

(10) Patent No.: US 11,935,407 B1
(45) Date of Patent: Mar. 19, 2024

(54) DYNAMIC LOOSE VEHICLE FORMATION METHOD BASED ON REAL-TIME ONLINE NAVIGATION MAP

(71) Applicant: SHANDONG UNIVERSITY OF SCIENCE AND TECHNOLOGY, Qingdao (CN)

(72) Inventors: Shufeng Wang, Qingdao (CN); Qingwei Liang, Qingdao (CN); Li Li, Qingdao (CN); Yuyan Wang, Qingdao (CN); Huayue Zhang, Qingdao (CN); Baokang Zhang, Qingdao (CN); Sunquan Long, Qingdao (CN); Guansheng Wu, Qingdao (CN); Mengqi Luo, Qingdao (CN); Xianbin Du, Qingdao (CN); Junyou Zhang, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 18/446,857

(22) Filed: Aug. 9, 2023

(30) Foreign Application Priority Data

Mar. 13, 2023 (CN) .......................... 202310231081.5

(51) Int. Cl.
*G08G 1/127* (2006.01)
*G01C 21/00* (2006.01)
(Continued)

(52) U.S. Cl.
CPC .......... *G08G 1/127* (2013.01); *G01C 21/3484* (2013.01); *G01C 21/3691* (2013.01); *G01C 21/3896* (2020.08)

(58) Field of Classification Search
CPC ................ G08G 1/127; G01C 21/3484; G01C 21/3691; G01C 21/3896
See application file for complete search history.

(56) References Cited

U.S. PATENT DOCUMENTS

2020/0402408 A1* 12/2020 Kobayashi ........... G05D 1/0293
2022/0252411 A1* 8/2022 Gardiner ............ G06Q 10/0631
(Continued)

FOREIGN PATENT DOCUMENTS

CN 109552330 A 4/2019

OTHER PUBLICATIONS

"Geng. R, et al., 'User Satisfaction-Aware Recourse Allocation for 5G Green Vehicle Platooning', pp. 870-872" (Year: 2019).*
(Continued)

*Primary Examiner* — Faris S Almatrahi
*Assistant Examiner* — Sahar Motazedi
(74) *Attorney, Agent, or Firm* — HAUPTMAN HAM, LLP

(57) ABSTRACT

A dynamic loose vehicle formation method based on real-time online navigation map, which belongs to the field of vehicle formation technologies. The method includes a driver inputs travel information of a destination and waypoints in a GIS app; the GIS app uploads the travel information to a GIS server; the driver chooses to join a recommended formation or create a formation in the GIS app; when the driver chooses the formation and joins the formation, the formation information is displayed on the GIS app interface and sent to other vehicles within the formation for information interaction; when the driver chooses to leave the formation and leaves the formation, the formation is adjusted and the GIS server updates the formation information.

7 Claims, 4 Drawing Sheets

(51) Int. Cl.
　　　*G01C 21/34*　　　(2006.01)
　　　*G01C 21/36*　　　(2006.01)

(56) References Cited

U.S. PATENT DOCUMENTS

2022/0270493 A1* 8/2022 Mok .................. G08G 1/22
2023/0015884 A1* 1/2023 Cao ................ G01C 21/3811

OTHER PUBLICATIONS

First Office Action issued in Chinese Application No. 202310231081.5; dated Apr. 18, 2023; 12 pgs.
Notification to Grant a Patent issued in Chinese Application No. 202310231081.5; dated Apr. 27, 2023; 3 pgs.

* cited by examiner

DYNAMIC LOOSE VEHICLE FORMATION METHOD BASED ON REAL-TIME ONLINE NAVIGATION MAP

RELATED APPLICATIONS

The present application claims priority from Chinese Application Number 202310231081.5, filed Mar. 13, 2023, the disclosure of which is hereby incorporated by reference herein in its entirety.

RELATED APPLICATIONS

The present application claims priority from Chinese Application Number 202310231081.5, filed Mar. 13, 2023, the disclosure of which is hereby incorporated by reference herein in its entirety.

TECHNICAL FIELD

The present invention relates to the field of vehicle formation technologies, and in particular to a dynamic loose vehicle formation method based on real-time online navigation map.

BACKGROUND

At present, vehicle formation refers to a special formation in which multiple vehicles travel with a small inter-vehicle distance at a relative constant speed, which saves fuel and improves traffic efficiency because of the small inter-vehicle distance and low wind resistance. Currently, the routine operation of a driver or driverless vehicle using a navigation map is to plan a path of a positioning location of the vehicle, waypoints and a destination. The GIS server recommends or updates a path based on a road network state, and a selection and a preference of the driver, and displays the path on a geographic information system (GIS) navigation map. After the driver starts the navigation map, the driver, based on the vehicle position obtained by GNSS, matches the position map to the GIS on which the vehicle position, the path, the movement direction, the speed and other characteristics are displayed. The drivers in a non-specific group cannot mutually see respective information such as position and destination but the drivers only in a specific group can mutually see the positions by setting a group in the navigation system, and thus the vehicles can travel in group along a same path toward a same destination but not travel in formation. Therefore, information interaction between vehicles is not satisfactory and hence, the possibility of improving the traffic efficiency by traveling in formation through information interaction is lower, and basically no applications yet.

Therefore, there is a need for a dynamic loose vehicle formation method based on real-time online navigation map, which allows drivers or vehicles to perform information interaction with each other and thus travel in formation, so as to improve the traffic efficiency.

SUMMARY

The aim of the present invention is to provide a dynamic loose vehicle formation method based on real-time online navigation map, in order to overcome the problem of unsatisfactory information interaction between vehicles and the lower possibility of improving the traffic efficiency by traveling in formation through information interaction in the prior arts.

In order to achieve the above purpose, the present invention provides a dynamic loose vehicle formation method based on real-time online navigation map, which includes the following steps: S1, a driver inputs travel information of a destination and waypoints in a GIS app; S2, the GIS app uploads the travel information to a GIS server; the GIS server performs formation matching on formation requests and existing formations in a path, and sends formation matching information to the GIS app; the driver chooses to join a recommended formation or create a formation in the GIS app; S3, when the driver chooses the formation and joins the formation, the GIS app updates vehicle information, and the GIS server updates the formation information, displays the updated formation information on the GIS app and sends the updated formation information to other vehicles within the formation for information interaction; S4, when the driver chooses to leave the formation and leaves the formation, the formation is adjusted and the GIS server updates the formation information.

Further, the step S2 specifically includes: S2.1, the formation matching is achieved in the following manner: based on the travel information of the destination and the waypoints, searching for the formation information within a range of a distance back and forth in the path, and based on a coincidence degree between a path or the travel preference parameters of the driver and a path or the speed of the formation, performing matching; S2.2, the formation matching information is sent to the GIS app of the vehicle, and thus, the driver selects a formation to join and the GIS server sends the vehicle information to other vehicles within the formation; S2.3, when the driver chooses not to join the formation, the driver chooses to create a formation in which the vehicle of the driver is a lead vehicle to be joined by other vehicles.

Further, the method by which the driver chooses the formation in the GIS app and joins the formation in the step S3 includes the following process: after the driver determines the formation to join, based on the travel information of the driver, the GIS app determines a target position for the driver to join the formation; the target position is displayed in the GIS app of the driver and GIS apps of the other vehicles in the formation to direct the driver to adjust the vehicle to join the formation; after a successful joining process, successful joining information is sent to the lead vehicle of the formation, and then the GIS server and the GIS apps of the other vehicles in the formation update the formation information in time.

Further, the target position includes joining by following from a tail of the formation, joining from a middle of the formation, and joining from a head of the formation as a lead vehicle: in a case of joining by following from the tail of the formation, the driver receives information from the GIS app, and then approaches the formation; when the vehicle and the formation are not in a same lane, the vehicle is adjusted to the same lane and identifies a license plate number of a vehicle at the end of the formation, and joins the formation with an intra-formation safe following distance; the GIS server and the GIS apps of the other vehicles in the formation update the formation information; in a case of joining from the middle of the formation, the GIS app transmits information to a target following vehicle in the formation and the driver at the same time; and the driver drives in an adjacent lane to be parallel to the target following vehicle; and the target following vehicle adjusts speed to increase a distance from a vehicle ahead, and at the same time, turns on emergency flashers and sends a message indicating to vehicles behind the vehicle in the formation to adjust simultaneously; when the distance is adjusted to be a safe cut-in distance, the driver joins the formation by lane change, while the vehicle behind follows with a safe distance; the GIS server and the GIS apps of the other vehicles in the formation update the formation information; in a case of joining from the head of the formation as the lead vehicle, after the driver receives information from the GIS app, the driver drives the vehicle to be ahead of the formation by acceleration and lane change operations, then keeps the vehicle at a constant speed; then an original lead vehicle in the formation identifies a license plate number of the driver and accelerates to approach and follows in a safe distance; the GIS server and the GIS apps of the vehicles in the formation update the formation information.

Further, the safe cut-in distance is calculated in the following formula $D=2*(V_m*t_m)+L_m$, wherein $V_m$ is a speed of the joining vehicle, in the unit of m/s, $t_m$ is a lane change time of the joining vehicle, $L_m$ is a vehicle length of the joining vehicle, in the unit of m.

Further, the step S4 includes the followings: when a to-leave vehicle is located at a tail of the formation, the to-leave vehicle slows down to increase a following distance to leave the formation, while the emergency flashers of the to-leave vehicle are turned on to indicate to vehicles behind to slow down earlier to avoid collision; the GIS server updates the formation information; when the to-leave vehicle is located in a middle of the formation, when there is safe space to change lanes in a target lane, the to-leave vehicle sends formation-leaving information to the lead vehicle and the vehicles behind the to-leave vehicle and the formation-leaving information also directs the to-leave vehicle to change lanes to leave the formation, then information is sent to the lead vehicle to indicate that the to-leave vehicle has left the formation; after the formation receives the information, an instruction is sent to the vehicles behind the leaving vehicle in the formation to direct the vehicles to travel in an original safe distance, and at the same time, the formation information is updated and uploaded to the GIS server; when the to-leave vehicle is the lead vehicle, the lead vehicle informs, by sending information or making voice calls, the vehicles behind that the lead vehicle is leaving the formation; the vehicle behind the lead vehicle becomes a new lead vehicle to continue leading the formation and updates the formation information in synchronization with the GIS server in time.

Further, the GIS app includes: an operation interface module, configured for the driver to input the travel information of the destination and the waypoints and view the formation information; a server module, configured to record a travel description file of the driver and analyze travel preference parameters of the driver; a communication network and internet-of-vehicles module, configured to perform information interaction with the GIS server to achieve information transmission and reception or perform voice call; and a formation matching module, configured to match the travel information input by the driver in the GIS app and the formation information in the GIS server.

Further, the travel preference parameters include: an average speed, a preferred speed, a work and rest time, a lane occupation habit, a preemptive drive or waiting habit, a distance keeping habit, a reaction time, a reaction time characteristic and a formation synchronization consistency; and a method of analyzing the travel preference parameters of the driver includes: calculating the average speed by recording a travel distance in a set period of 3 to 5 minutes; analyzing the preferred speed based on a frequency of the average speed, where the preferred speed is related to a road type, and expressways, highways and urban roads have different preferred speeds; recording the work and rest time based on a travel time; recording the lane occupation habit based on a ratio of a time length of habitually occupying a lane position to a total travel time, where the lane position includes a left lane, a middle lane or a right lane; analyzing the preemptive drive or waiting habit by comparison of a speed through a traffic light and a speed of a road section; analyzing the distance keeping habit based on a distance of adjacent vehicles in the formation; recording the reaction time based on the distances of the vehicles at the time of formation starting and decelerating to stop; and analyzing the reaction time characteristic based on common values of the reaction time; evaluating the formation synchronization consistency based on whether the speed of the vehicle in the formation, a following distance, and the reaction time of the driver are consistent with formation travel parameters.

Further, the step S2.1 includes: S2.1.1, reading the travel description file of the driver according to a user ID to obtain the travel preference parameters of the driver; S2.1.2, taking the travel preference parameters of the driver at a moment as a set represented by a vector $U(R_{i1}, R_{i2}, \ldots, R_{in})$, where $R_{ij}$ represents a value of a travel parameter j in the travel preference parameters stored under the user ID corresponding to the drive as user i, and n is a total number of the travel parameters, including but not limited to distance keeping, speed, lane change and overtake; S2.1.3, based on adjusted cosine similarity, calculating a similarity $S_{sim}(p,q)_{Acosine}$ of travel preference parameters between users in the following formula:

$$\frac{\sum_{j \in J}(R_{pj} - \overline{R_{pj}})(R_{qj} - \overline{R_{qj}})}{\sqrt{\sum_{j \in J}(R_{pj} - \overline{R_{pj}})^2} \sqrt{\sum_{j \in J}(R_{qj} - \overline{R_{qj}})^2}}$$

wherein, J represents a full set of travel preference parameters, $R_{pj}$ and $R_{qj}$ respectively represent values of the travel preference parameters j of the users p, q at a same moment in travel description file stored under user IDs corresponding to the users p, q, $\overline{R_{pj}}$ and $\overline{R_{qj}}$ respectively represent average values of the travel preference parameters j corresponding to the users p, q; S2.1.4, using the formula in the step S2.1.3, calculating a similarity between the travel preference parameters of the driver to join the formation and user parameter settings of a lead vehicle of each of the existing formations within a proximity range of the drive to join the formation, then sorting the similarities in a descending order, and selecting and recommending the first N formations with the highest similarity to the driver to join the formation for formation selection.

Further, the travel description file of the driver includes a personal attribute feature, the travel information and the travel preference parameters of the driver, where the personal attribute feature includes basic personal information of the driver such as gender, age, and occupation; the travel information includes a travel time, a travel departure location, the destination and travel preference information.

The present invention has the following beneficial effects. The present invention realizes spontaneous organization of the vehicle formation by use of real-time online navigation GIS and communication network through a GIS app, realizes intra-formation vehicle information interaction or voice call by use of the GIS, and also realizes the effect of marking relevant information such as formation name and formation member vehicles on the GIS. The formation also has the advantage of reducing wind resistance and increasing the traffic efficiency.

BRIEF DESCRIPTIONS OF THE DRAWINGS

In order to clearly illustrate technical solutions in the specific embodiments of the present invention or in prior art, the drawings required for descriptions of the specific embodiments or the prior arts will be briefly introduced. Apparently, the drawings described hereunder are only some embodiments of the present invention and those skilled in the arts can also obtain other drawings based on these drawings without making creative work.

DETAILED DESCRIPTIONS OF EMBODIMENTS

Figure 1:
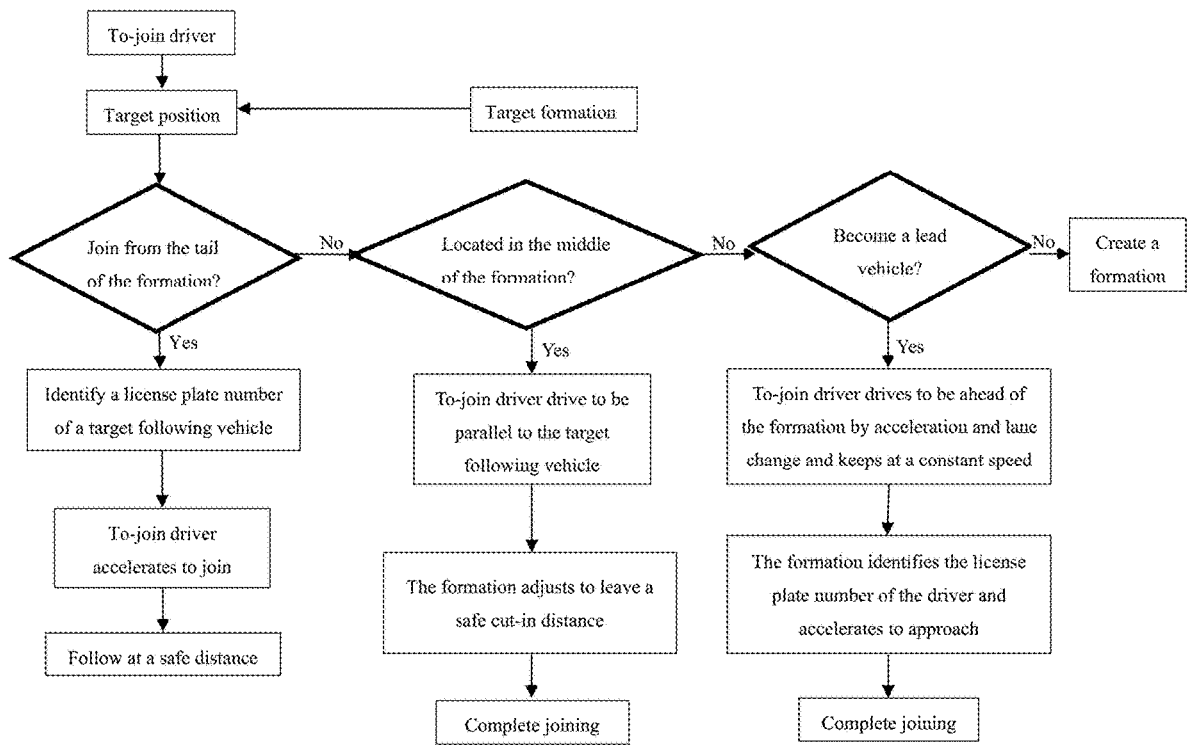
FIG. 1 is a flowchart illustrating a process in which a to-join vehicle joins a formation at a target position in a dynamic loose vehicle formation method based on real-time online navigation map according to an embodiment of the present invention.

The technical solutions of the present invention will be fully and clearly described in combination with the drawings. Apparently, the embodiments described herein are only some embodiments of the present invention rather than all embodiments. All other embodiments obtained by those skilled in the art based on the embodiments of the present invention without making creative work shall fall within the scope of protection of the present invention.

Firstly, some terms of the present invention will be explained below.

Formation refers to a platoon of two or more vehicles which travel at a relatively consistent speed in a following way based on wireless communication technology.

Travel in formation refers to that two or more vehicles travel in formation in a specific scenario, which includes the processes of creating a formation, dissolving a formation, allowing a vehicle to join a formation, and allowing a vehicle to leave a formation and the like.

Lead vehicle refers to a vehicle ahead of a formation.

Following vehicle refers to other following vehicles other than the lead vehicle in a formation.

GIS refers to a geographic information system, which is responsible for navigation map data.

In order to achieve the above purpose, the present invention provides a dynamic loose vehicle formation method based on real-time online navigation map, which includes the following steps: S1, a driver inputs travel information of a destination and waypoints in a GIS app, where the driver includes a vehicle driver, or a passenger at the time of unmanned driving; S2, the GIS app uploads the travel information to a GIS server; the GIS server performs formation matching on formation requests and existing formations in a path, and sends formation matching information to the GIS app; the driver chooses to join a recommended formation or create a formation in the GIS app, where the formation requests refer to the input travel information of the destination and waypoints.

The driver of the vehicle takes a current formation-joining position as a matching start point of a common journey, and a distance and a time traveled together in formation are factors to be considered for the formation. If the distance and the time are small, the formation benefits cannot be reflected. The formation matching is based on a route coincidence and a travel time and the like subsequent to formation while a matching threshold is set for different types (different design speeds) of roads such as expressways, highways, and urban roads etc. The thresholds include but not limited to the thresholds of expressways, highways and urban roads, where a distance traveled in 1 h (80 km/h), 0.5 h (60 km/h), or 0.3 h (40 km/h) or driving distance at an equivalent medium speed is the lowest recommended formation threshold. The thresholds of search scope are set based on the distance and travel time, with the travel speed 60 km/h as intermediate value, acceleration to catch up and deceleration to wait for 5 minutes and 10 km as the search thresholds, the thresholds can be corrected based on the situations such as different roads, and joining before and after the formation and the like.

Formation is performed based on the road types such as urban roads, highways, and expressways and the vehicle types such as passenger cars and trucks, while keeping usual speed consistency. The formation scale is determined based on a distance between road crossings and a distance between a ramp exit and a ramp entrance of an expressway and the like. If a signal control system supports vehicle-road coordination, the road crossing signal and the formation speed can be optimized and thus the formation scale can be slightly larger. For an expressway, if the common journey is long and the expressway has three or more lanes, the formation scale can be slightly larger. Since the formation is a loose one, the system does not reject those voluntarily joining vehicles. But, when a maximum scale is reached, a joining vehicle is no longer recommended or matched.

Specifically, the step S2 includes: S2.1, the formation matching is achieved in the following manner: based on the travel information of the destination and the waypoints, searching for the formation information within a range of a distance back and forth in the path, and based on a coincidence degree between a path or the travel preference parameters of the driver and a path or the speed of the formation, performing matching. Before formation matching, those formations with saturated formation scale are not recommended. According to different types of roads, the formation scales for the expressways, the highways and the urban roads are determined as 20 vehicles, 15 vehicles, and 8 vehicles respectively. If there is one formation with member vehicles greater than the above corresponding threshold in the existing formations traveling on a road, the formation is not involved in formation matching.

The step S2.1 includes: S2.1.1, reading the travel description file of the driver according to a user ID to obtain the travel preference parameters of the driver; S2.1.2, taking the travel preference parameters of the driver at a moment as a set represented by a vector $U(R_{i1}, R_{i2}, \ldots, R_{in})$, wherein $R_{ij}$ represents a value of a travel parameter j in the travel preference parameters stored under the user ID corresponding to the driver as user i, and n is a total number of the travel parameters, including but not limited to distance keeping, speed, lane change and overtake; S2.1.3, based on adjusted cosine similarity, calculating a similarity $S_{sim}(p,q)_{Acosine}$ of travel preference parameters between users in the following formula:

$$\frac{\sum_{j \in J}(R_{pj} - \overline{R_{pj}})(R_{qj} - \overline{R_{qj}})}{\sqrt{\sum_{j \in J}(R_{pj} - \overline{R_{pj}})^2} \sqrt{\sum_{j \in J}(R_{qj} - \overline{R_{qj}})^2}}$$

wherein, J represents a full set of travel preference parameters, $R_{pj}$ and $R_{qj}$ respectively represent values of the travel preference parameters j of the users p, q at a same moment in travel description file stored under user IDs corresponding to the users p, q; $\overline{R_{pj}}$ and $\overline{R_{qj}}$ respectively represent average values of the travel preference parameters j corresponding to the users p, q; S2.1.4, using the formula in the step S2.1.3, calculating a similarity between the travel preference parameters of the driver to join the formation and user parameter settings of a lead vehicle of each of the existing formations within a proximity range of the user to join the formation, then sorting the similarities in a descending order, and selecting and recommending the first N formations with the highest similarity to the driver to join the formation for formation selection.

With a travel speed preference as an example, based on the vehicle travel speed parameter recorded in the travel description file stored under the user ID of the traveler p, travel speed scores $v_{p1}$, $v_{p2}$, . . . $v_{pn}$ for a period before joining the formation are taken to calculate a smooth travel speed as $V_p$, where $V_p = (v_{p1} + v_{p2} + \ldots v_{pn})/n$.

By analogy, the smooth travel speeds of the lead vehicles $q_1, q_2, \ldots, q_n$ of matchable formations within the scope of the vehicle of the traveler p to join the formation can be calculated as $V_{q1}, V_{q2}, \ldots, V_{qn}$ respectively.

By calculating the Euclidean distances between $V_{q1}$, $V_{q2}, \ldots, V_{qn}$ and $V_p$, the formations are ranked in an ascending order of distance. The smaller the distance, the higher the similarity the formation has. Thus, they can be matched better.

Other parameter similarities can be obtained this way.

S2.2, after the matching is completed, the formation matching information is sent to the GIS app of the vehicle, and the driver selects a formation to join; the GIS server sends the vehicle information to other vehicles in the formation.

S2.3, when the driver chooses not to join the formation, the driver chooses to create a formation in which the vehicle of the driver is a lead vehicle to be joined by other vehicles.

S3, when the driver chooses the formation and joins the formation, the GIS app updates vehicle information, and the GIS server updates the formation information, displays the updated formation information on the GIS app and sends the updated formation information to other vehicles within the formation for information interaction. Specifically, the method by which the driver chooses the formation in the GIS app and joins the formation in the step S3 includes the following process: after the driver determines the formation to join, based on the travel information of the driver, the GIS app determines a target position for the driver to join the formation; the target position is displayed in the GIS app of the driver and GIS apps of the other vehicles in the formation to direct the driver to adjust the vehicle to join the formation; after a successful joining process, successful joining information is sent to the lead vehicle of the formation, and then the GIS server and the GIS apps of the other vehicles in the formation update the formation information in time.

Specifically, as shown in FIG. 1, the target position for joining the target formation includes joining by following from a tail of the formation, joining from a middle of the formation, and joining from a head of the formation as a lead vehicle: In a case of joining by following from the tail of the formation, the driver receives information from the GIS app, and then approaches the formation; when the vehicle and the formation are not in a same lane, the vehicle is adjusted to the same lane and identifies a license plate number of a vehicle at the end of the formation, and joins the formation with an intra-formation safe following distance; the GIS server and the GIS apps of the other vehicles in the formation update the formation information; in a case of joining from the middle of the formation, the GIS app transmits information to a target following vehicle in the formation and the driver at the same time; and the target following vehicle adjusts speed to increase a distance from a vehicle ahead, and at the same time, turns on emergency flashers and sends a message indicating to vehicles behind the vehicle in the formation to adjust simultaneously; when the distance is adjusted to be a safe cut-in distance, the driver joins the formation by lane change, while the vehicle behind follows with a safe distance; the GIS server and the GIS apps of the other vehicles in the formation update the formation information; in a case of joining from the head of the formation as the lead vehicle, after the driver receives information, the driver drives the vehicle to be ahead of the formation by acceleration and lane change operations, then keeps the vehicle at a constant speed; then an original lead vehicle in the formation identifies a license plate number of the driver and accelerates to approach and follows in a safe distance; the GIS server and the GIS apps of the vehicles in the formation update the formation information.

Specifically, the safe cut-in distance is calculated by the formula $D=2*(V_m*t_m)+L_m$, wherein $V_m$ is a speed of the joining vehicle, in the unit of m/s, $t_m$ is a lane change time of the joining vehicle, $L_m$ is a vehicle length of the joining vehicle, in the unit of m.

Specifically, if there is no suitable formation around, the driver can create a formation as a lead vehicle. Surrounding vehicles traveling independently, with the intention to join a formation spontaneously approach the formation based on the information obtained by the GIS app from the GIS server, and the following vehicles joining the formation later follow at a safe inter-vehicle distance. The GIS server sends the recommended vehicle speed and inter-vehicle distance, while the system is updated to display the information of the newly-formed formation in the GIS.

S4, when the driver chooses to leave the formation and leaves the formation, the formation is adjusted such that the GIS server updates the formation information.

Specifically, a member vehicle within the formation may leave the formation due to arrival at the destination or reception of a formation change request form the GIS server (a new formation updates and matches the vehicle).

Figure 2:
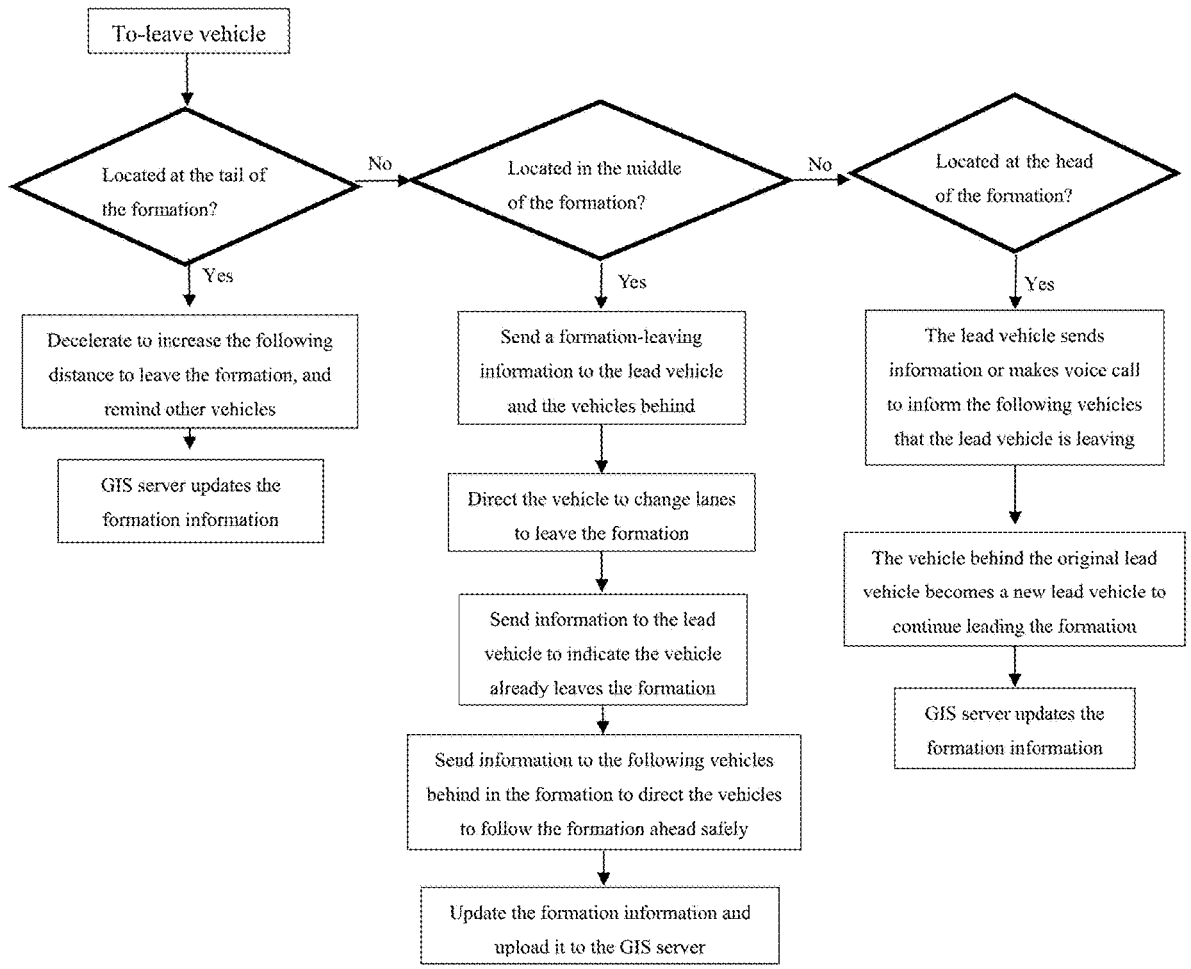
FIG. 2 is a flowchart illustrating a process in which a to-leave vehicle leaves a formation in a dynamic loose vehicle formation method based on real-time online navigation map according to an embodiment of the present invention.

Specifically, as shown in FIG. 2, the step S4 specifically includes the followings: when a to-leave vehicle is located at a tail of the formation, the to-leave vehicle slows down to increase a following distance to leave the formation, while the emergency flashers of the to-leave vehicle are turned on to indicate to vehicles behind to slow down earlier to avoid collision; the GIS server updates the formation information; when the to-leave vehicle is located in a middle of the formation, when there is safe space to change lanes in a target lane, the to-leave vehicle sends formation-leaving information to the lead vehicle and the vehicles behind the to-leave vehicle and the formation-leaving information also directs the to-leave vehicle to change lanes to leave the formation, then information is sent to the lead vehicle to indicate that the to-leave vehicle has left the formation; after the formation receives the information, an instruction is sent to the vehicles behind the leaving vehicle in the formation to direct the vehicles to travel in an original safe distance, and at the same time, the formation information is updated and uploaded to the GIS server; when the to-leave vehicle is the lead vehicle, the lead vehicle informs, by sending information or making voice call, the vehicles behind that the lead vehicle is leaving the formation; the vehicle behind the lead vehicle becomes a new lead vehicle to continue leading the formation and updates the formation information in synchronization with the GIS server in time.

Specifically, the GIS app includes: an operation interface module, configured for the driver to input the travel information of the destination and the waypoints and view the formation information; on the interface of GIS app, a formation mark, a bright feature of the lead vehicle (formation ID or a formation name taken after the name of the lead vehicle), and the formation speed etc. are displayed. On the GIS interface, a uniform vehicle color, a sequence number of each joining vehicle, a distance between adjacent vehicles and a license plate number of each vehicle in the formation are displayed dynamically, where the formation ID can be set manually or automatically named by the system.

The GIS app further includes a server module, configured to record a travel description file of the driver and analyze travel preference parameters of the driver.

Figure 3:
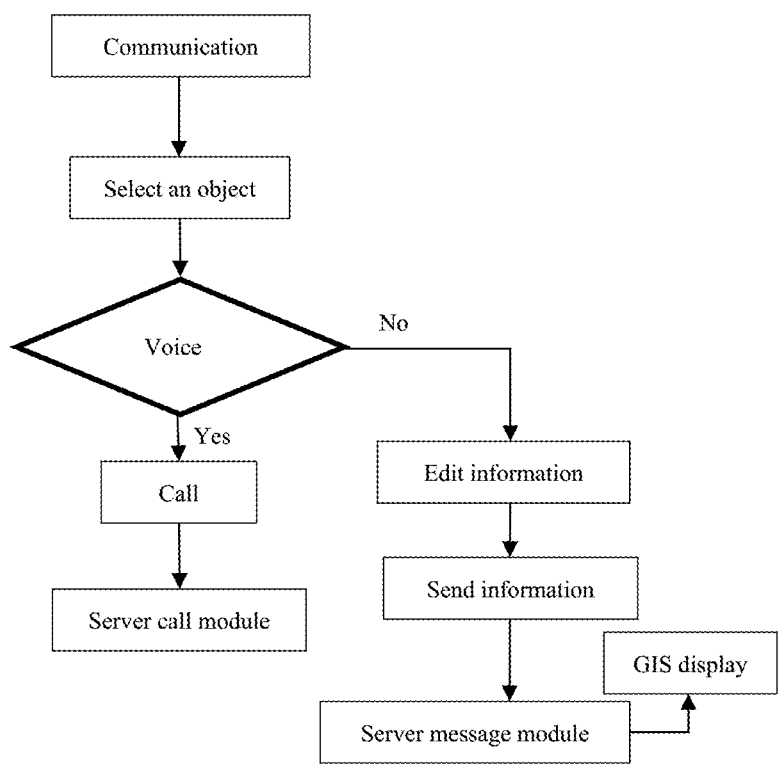
FIG. 3 is a flowchart illustrating communication in a loose vehicle formation of the present invention.

The GIS app further includes a communication network and internet-of-vehicles module, configured to perform information interaction with the GIS server to achieve information transmission and reception or perform voice call. As shown in FIG. 3, for the communication network and internet-of-vehicles module, the driver of a vehicle in the formation may click a marking point of another vehicle to transmit information or make voice call, or select a formation to send or broadcast information in the formation to coordinate the arrangements such as speed and work and rest etc. of the formation and also can drive at a small inter-vehicle distance safely by mutual prompt. The GIS server, as a navigation information service center, receives and distributes information and makes a GIS app information display rule. The usual information includes but not limited to: the recommended speed value, and the stop service area etc. The voice call is made based on IP network telephone technology, and the license plate number of each vehicle in the formation is denoted as IP mark.

The GIS app further includes a formation matching module, configured to match the travel information input by the driver in the GIS app and the formation information in the GIS server.

Specifically, the travel preference parameters include: an average speed, a preferred speed, a work and rest time, a lane occupation habit, a preemptive drive or waiting habit, a distance keeping habit, a reaction time, a reaction time characteristic and a formation synchronization consistency. A method of analyzing the travel preference parameters of the driver includes: calculating the average speed by recording a travel distance in a set period of 3 to 5 minutes; analyzing the preferred speed based on a frequency of the average speed, where the preferred speed is related to a road type, and expressways, highways and urban roads have different preferred speeds; recording the work and rest time based on a travel time; recording the lane occupation habit based on a ratio of a time length of habitually occupying a lane position to a total travel time, where the lane position includes a left lane, a middle lane or a right lane; analyzing the preemptive drive or waiting habit by comparison of a speed through a traffic light and a speed of a road section; analyzing the distance keeping habit based on a distance of adjacent vehicles in the formation; recording the reaction time based on the distances of the vehicles at the time of formation starting and decelerating to stop; and analyzing the reaction time characteristic based on common values of the reaction time; evaluating the formation synchronization consistency based on whether the speed of the vehicle, a following distance, and the reaction time of the driver are consistent with formation travel parameters.

With the inter-vehicle distance as an example, the method of evaluating the formation synchronization consistency is as follows: if the inter-vehicle distance is usually kept too large, the formation effect will be affected. The inter-vehicle distance keeping can be evaluated as excellent, good, medium and acceptable based on a ratio of a time length of keeping the inter-vehicle distance to a time length for being in the formation, i.e. [100%, 90%], (90%, 80%], (80%, 70%], (70%, 60%], and the valuation is sent after the driver leaves the formation, to remind the driver of keeping the inter-vehicle distance in next travel. If the inter-vehicle distance keeping is often lower than 60%, it indicates that the vehicle is no longer matched with the formation in a period of time, whereas if the inter-vehicle is often higher than 90%, it indicates that a matching formation can be preferentially recommended to the driver. By this penalty mechanism, the inter-vehicle distance of the formation is maintained within a reasonable range. Likewise, the driving habits of the driver such as speed, lane change and overtake in the formation, which affect the normal travel of the formation, can be evaluated as excellent, good, medium and acceptable by using a ratio of the corresponding index appearing in the formation, i.e. [100%, 90%], (90%, 80%], (80%, 70%], (70%, 60%]. For a vehicle driver with good synchronization, a formation with good synchronization is preferentially recommended.

The travel speed and the inter-vehicle distance of the formation are important travel parameters. The inter-vehicle distance is related to the vehicle speed, the road situation and the reaction characteristics of the driver etc. and thus the optimal inter-vehicle distance of the formation is based on the drive habit and the reaction characteristics of the driver in the formation and the driver is prompted in a case of too large or small inter-vehicle distance. A client of the driver compares the distance between the vehicle and the vehicle ahead with the recommended inter-vehicle distance of the formation. If the forward inter-vehicle distance is greater than the recommended inter-vehicle distance, the GIS server may give out sound or vibration or the like to prompt the driver to make close observation, and accelerate to maintain the optimal inter-vehicle distance. If the following vehicle finds the vehicle ahead maintains too large an inter-vehicle distance, the following vehicle may honk or flash lamps or the like to prompt or directly overtake the vehicle ahead. After overtaking, the system will automatically update the vehicle sequence number.

The GIS server may monitor a travel state of the formation, and can plan an optimal travel speed for the driver of the lead vehicle according to the travel speed, the path and the road traffic situation ahead.

Figure 4:
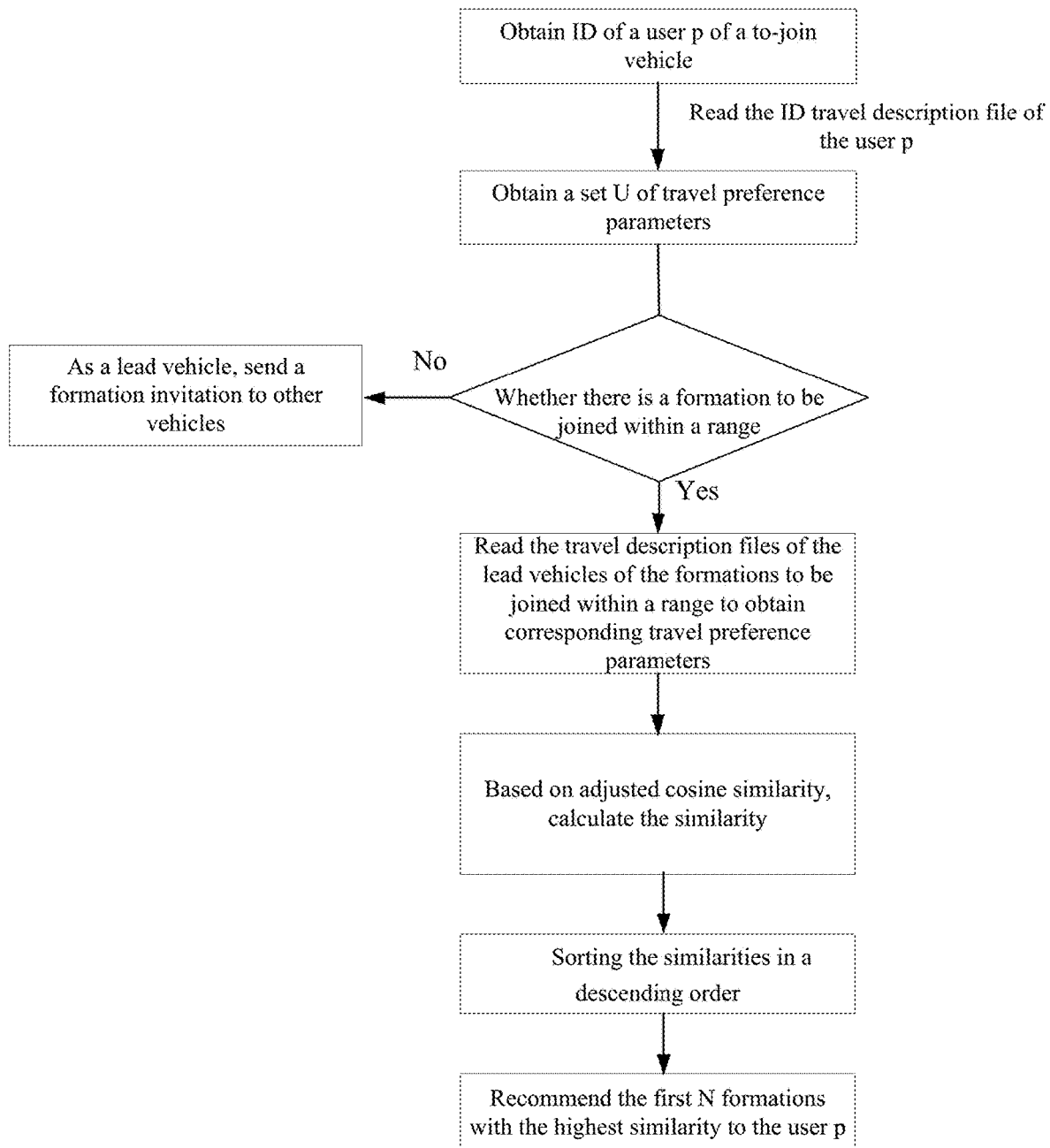
FIG. 4 is a flowchart illustrating a method of performing formation matching based on travel preference parameters according to an embodiment of the present invention.

As shown in FIG. 4, in the present invention, formation matching is also performed based on the travel preference parameters of the driver. Before formation matching, those formations with saturated formation scale are not recommended. According to different types of roads, the formation scales for the expressways, the highways and the urban roads are determined as 20 vehicles, 15 vehicles, and 8 vehicles respectively. If there is one formation with member vehicles greater than the above corresponding threshold in the formations traveling on a road, the formation is not involved in formation matching.

Each driver corresponds to one user ID, where the user IDs are not repeated. When submitting an order or entering the vehicle, the user completes login and identification of the user ID. Each user ID corresponds to one travel description file.

Specifically, the travel description file of the driver includes a personal attribute feature, the travel information and the travel preference parameters of the driver; where the personal attribute feature includes basic personal information of the driver such as gender, age, and occupation; the travel information includes a travel time, a travel departure location, the destination and travel preference information.

The present invention designs a dynamic loose vehicle formation method oriented to a non-specific driver or a driverless vehicle passenger. In the method, a small inter-vehicle distance can be maintained, the wind resistance is reduced, and the road traffic efficiency is improved. The driver spontaneously organizes vehicles into a formation by use of real-time online navigation GIS and the communication network, and can make vehicle information interaction or voice call within the formation by using the GIS server, and also implement a system and method of marking the formation information such as formation name, license plate number of the vehicles, vehicle model, and path on the GIS.

The specific method and principle of the present invention is as follows: in the present invention, with an intention of vehicle drivers to join a formation, a formation is formed based on travel information shared on the real-time online navigation GIS app. After a navigation path is generated by inputting information such as a destination and waypoints t from the driver end, the information is uploaded to the GIS server which recommends a path based on a road network state. Based on the historical data such as the position, the path, the formation selection, and the information travel of the driver, the server recommends to the driver the vehicle information of the vehicles using the same type of real-time online navigation GIS app and intending to travel in formation, and thus these vehicles intending to travel in formation can mutually see the relative position, and the path and the like, thus facilitating travel in formation together.

Whether creating a formation or joining an existing formation, the GIS interface can display the formation ID, the member number of the formation, the color, the license plate number of the member vehicles, the sequence numbers of the vehicles in the formation and the like to help the vehicles in the formation and the independently-traveling vehicles on the roads to known about the formation information. The GIS server, based on the number of vehicles in the formation and the common path ahead, provides a journey time and service area information of the formation, and based on the energy supply of the vehicles and the drive time of the drivers and the like, provides a plan of travel in formation. The drivers of the formation may click an information point of any vehicle in the formation to make voice call or send information to coordinate the travel parameters of the vehicles in the formation. The GIS server may record the travel preference parameters of the driver, and the GIS app and the server may analyze the travel preference parameters and the like to match an appropriate formation.

Of course, the above descriptions are not intended to limit the present invention and the present invention is also not limited to the above examples. Any changes, modifications, additions or replacements made by those skilled in the arts within the essence scope of the present invention shall fall within the scope of protection of the present invention.

The invention claimed is:

1. A dynamic loose vehicle formation method based on real-time online navigation map, comprising the following steps:
    S1, a driver inputs travel information of a destination and waypoints in a GIS app;
    S2, the GIS app uploads the travel information to a GIS server; the GIS server performs formation matching on formation requests and existing formations in a path, and sends formation matching information to the GIS app; the driver chooses to join a recommended formation or create a formation in the GIS app;
    S3, when the driver chooses the formation and joins the formation, the GIS app updates vehicle information, and the GIS server updates formation information, displays the updated formation information on the GIS app and sends the updated formation information to other vehicles within the formation for information interaction;
    S4, when the driver chooses to leave the formation and leaves the formation, the formation is adjusted and the GIS server updates the formation information;
    the GIS app comprises:
        an operation interface module, configured for the driver to input the travel information of the destination and the waypoints and view the formation information;
        a server module, configured to record a travel description file of the driver and analyze travel preference parameters of the driver;
        a communication network and internet-of-vehicles module, configured to perform information interaction with the GIS server to achieve information transmission and reception or perform voice call; and
        a formation matching module, configured to match the travel information input by the driver in the GIS app and the formation information in the GIS server;
    the step S2 comprises the following steps:
        S2.1, the formation matching is achieved in the following manner: based on the travel information of the destination and the waypoints, searching for the formation information within a range of a distance back and forth in the path, and based on a coincidence degree between a path or the travel preference parameters of the driver and a path or speed of the formation, performing matching;
        S2.2, the formation matching information is sent to the GIS app of the vehicle, and thus, the driver selects a formation to join and the GIS server sends the vehicle information to other vehicles within the formation;
        S2.3, when the driver chooses not to join the formation, the driver chooses to create a formation in which the vehicle of the driver is a lead vehicle to be joined by other vehicles;
    the step S2.1 comprises:
        S2.1.1, reading the travel description file of the driver according to a user ID to obtain the travel preference parameters of the driver;
        S2.1.2, taking the travel preference parameters of the driver at a moment as a set represented by a vector U($R_{i1}, R_{i2}, \ldots, R_{in}$), wherein $R_{ij}$ represents a value of a travel parameter j in the travel preference parameters stored under the user ID corresponding to the driver as user i, and n is a total number of the travel parameters, comprising distance keeping, speed, lane change and overtake;

S2.1.3, based on adjusted cosine similarity, calculating a similarity $S_{sim}(p,q)_{Acosine}$ of travel preference parameters between users in the following formula:

$$\frac{\sum_{j\in J}(R_{pj}-\overline{R_{pj}})(R_{qj}-\overline{R_{qj}})}{\sqrt{\sum_{j\in J}(R_{pj}-\overline{R_{pj}})^2}\sqrt{\sum_{j\in J}(R_{qj}-\overline{R_{qj}})^2}}$$

wherein, J represents a full set of travel preference parameters, $R_{pj}$ and $R_{qj}$ respectively represent values of the travel preference parameters j of the users p, q at a same moment in travel description file stored under user IDs corresponding to the users p, q, $\overline{R_{pj}}$ and $\overline{R_{qj}}$ respectively represent average values of the travel preference parameters j corresponding to the users p, q;

S2.1.4, using the formula in the step S2.1.3, calculating a similarity between the travel preference parameters of the driver to join the formation and user parameter settings of a lead vehicle of each of the existing formations within a proximity range of the driver to join the formation, then sorting the similarities in a descending order, and selecting and recommending the first N formations with the highest similarity to the driver to join the formation for formation selection.

2. The method of claim 1, wherein the method by which the driver chooses the formation in the GIS app and joins the formation in the step S3 comprises the following process: after the driver determines the formation to join, based on the travel information of the driver, the GIS app determines a target position for the driver to join the formation; the target position is displayed in the GIS app of the driver and GIS apps of the other vehicles in the formation to direct the driver to adjust the vehicle to join the formation; after a successful joining process, successful joining information is sent to the lead vehicle of the formation, and then the GIS server and the GIS apps of the other vehicles in the formation update the formation information in time.

3. The method of claim 2, wherein the target position comprises joining by following from a tail of the formation, joining from a middle of the formation, and joining from a head of the formation as a lead vehicle:

in a case of joining by following from the tail of the formation, the driver receives information from the GIS app, and then approaches the formation; when the vehicle and the formation are not in a same lane, the vehicle is adjusted to the same lane and identifies a license plate number of a vehicle at the end of the formation, and joins the formation with an intra-formation safe following distance; the GIS server and the GIS apps of the other vehicles in the formation update the formation information;

in a case of joining from the middle of the formation, the GIS app transmits information to a target following vehicle in the formation and the driver at the same time; and the driver drives in an adjacent lane to be parallel to the target following vehicle; and the target following vehicle adjusts speed to increase a distance from a vehicle ahead, and at the same time, turns on emergency flashers and sends a message indicating to vehicles behind the vehicle in the formation to adjust simultaneously; when the distance is adjusted to be a safe cut-in distance, the driver joins the formation by lane change, while the vehicles behind follow with a safe distance; the GIS server and the GIS apps of the other vehicles in the formation update the formation information;

in a case of joining from the head of the formation as the lead vehicle, after the driver receives information from the GIS app, the driver drives the vehicle to be ahead of the formation by acceleration and lane change operations, then keeps the vehicle at a constant speed; then an original lead vehicle in the formation identifies a license plate number of the driver and accelerates to approach and follows in a safe distance; the GIS server and the GIS apps of the other vehicles in the formation update the formation information.

4. The method of claim 3, wherein, the safe cut-in distance is calculated in the formula:

$$D=2*(V_m*t_m)+L_m$$

wherein, $V_m$ is a speed of the joining vehicle, in the unit of m/s, $t_m$ is a lane change time of the joining vehicle, $L_m$ is a vehicle length of the joining vehicle, in the unit of m.

5. The method of claim 1, wherein the step S4 comprises the following process:

when a to-leave vehicle is located at a tail of the formation, the to-leave vehicle slows down to increase a following distance to leave the formation, while the emergency flashers of the to-leave vehicle are turned on to indicate to vehicles behind to slow down earlier to avoid collision; the GIS server updates the formation information;

when the to-leave vehicle is located in a middle of the formation, when there is safe space to change lanes in a target lane, the to-leave vehicle sends formation-leaving information to the lead vehicle and the vehicles behind the to-leave vehicle and the formation-leaving information also directs the to-leave vehicle to change lanes to leave the formation, then information is sent to the lead vehicle to indicate that the to-leave vehicle has left the formation; after the formation receives the information, an instruction is sent to the vehicles behind the leaving vehicle in the formation to direct the vehicles to travel in an original safe distance, and at the same time, the formation information is updated and uploaded to the GIS server;

when the to-leave vehicle is the lead vehicle, the lead vehicle informs, by sending information or making voice calls, the vehicles behind that the lead vehicle is leaving the formation; the vehicle behind the lead vehicle becomes a new lead vehicle to continue leading the formation and updates the formation information in synchronization with the GIS server in time.

6. The method of claim 1, wherein the travel preference parameters comprise: an average speed, a preferred speed, a work and rest time, a lane occupation habit, a preemptive drive or waiting habit, a distance keeping habit, a reaction time, a reaction time characteristic and a formation synchronization consistency; and a method of analyzing the travel preference parameters of the driver comprises:

calculating the average speed by recording a travel distance in a set period of 3 to 5 minutes;

analyzing the preferred speed based on a frequency of the average speed, wherein the preferred speed is related to a road type, and expressways, highways and urban roads have different preferred speeds; recording the work and rest time based on a travel time;

recording the lane occupation habit based on a ratio of a time length of habitually occupying a lane position to a total travel time, wherein the lane position comprises a left lane, a middle lane or a right lane;

analyzing the preemptive drive or waiting habit by comparison of a speed through a traffic light and a speed of a road section;

analyzing the distance keeping habit based on a distance of adjacent vehicles in the formation;

recording the reaction time based on the distances of the vehicles at the time of formation starting and decelerating to stop; and analyzing the reaction time characteristic based on common values of the reaction time;

evaluating the formation synchronization consistency based on whether the speed of the vehicle in the formation, a following distance, and the reaction time of the driver are consistent with formation travel parameters.

7. The method of claim 1, wherein the travel description file of the driver comprises a personal attribute feature, the travel information and the travel preference parameters of the driver;

wherein the personal attribute feature comprises basic personal information of the driver such as gender, age, and occupation;

the travel information comprises a travel time, a travel departure location, the destination and travel preference information.

* * * * *